United States Patent Office 2,837,493
Patented June 3, 1958

2,837,493

EPOXY RESIN COMPOSITIONS CONTAINING POLYVALENT METAL PHENOLATES OR PHENOLATE-ALDEHYDE RESINS AND THE PROCESS OF THEIR PRODUCTION

Felix Schlenker, Wiesbaden, Germany, assignor to Chemische Werke Albert, Wiesbaden-Biebrich, Germany, a corporation of Germany No Drawing. Application April 12, 1955
Serial No. 500,998

Claims priority, application Germany April 17, 1954

20 Claims. (Cl. 260—33.4)

This invention relates to processes for improving the hardening characteristics of epoxy resins or resin compositions and to the resulting resins or resin compositions.

Heretofore it has been proposed to harden or cure epoxy resins in the presence of a variety of hardening catalysts, such as, for example, alkali or alkaline earth metal hydroxides, diethylamine, piperidine, triethanolamine, cyanamide or its polymerization products, polyamines of the most varied character, phthalic anhydride and maleic anhydride or its derivatives and the like. It has also been proposed to harden epoxy resins with such synthetic resins as phenol or urea resins. My British specification No. 722,045 describes the use of metal alcoholates of aliphatic alcohols as hardening catalysts for epoxy resins and my British specification No. 722,154 describes the use of metal salts of compounds exhibiting keto-enol tautomerism for the same purpose.

I have now found that polyvalent metal phenolates and condensation products thereof with aldehydes, which are, in effect, polyvalent metal-modified phenol-aldehyde resins, are excellent hardening activators or catalysts for epoxy resins. This group of material possesses a number of advantages as compared with those proposed hitherto and are referred to herein as hardening agents. Thus, the polyvalent metal phenolates themselves possess a greater stability, with only a slight tendency to hydrolysis, as compared with metal alcoholates; and the polyvalent metal-modified phenol-aldehyde resins have even a higher resistance to hydrolysis. Moreover, the polyvalent metal-modified phenol-aldehyde resins have a greater hardening effect than ordinary phenol resins which may be attributed to the occurrence of metal complex formation during the hardening process. Thus, on the one hand, hardening with the polyvalent metal-modified phenol-aldehyde resins apparently takes place in the same manner as with the previously proposed phenol resin, but at the same time additional cross-linking is brought about by the simultaneous incorporation of metal.

According to the present invention, therefore, we provide a hardenable epoxy resin composition comprising an epoxy resin and one or more polyvalent metal phenolates and/or one or more polyvalent metal-modified phenol-aldehyde resins obtained by condensation of a polyvalent metal phenolate with an aldehyde.

The polyvalent metal phenolates used in the composition according to the invention may be obtained in any convenient manner and are advantageously obtained from a polyvalent metal alcoholate, such as aluminum triisopropoxide or aluminum tributoxide, by "re-alcoholizing" with the appropriate phenol, that is by replacing the alcohol in the alcoholate by reaction with the phenol. Due to the acid character of phenols, phenolate formation takes place readily under mild conditions. Similarly metal phenolates, as is generally known, may be obtained by reacting the metal or a salt thereof, such as the chloride, directly with the phenol. Metal phenolates are more or less colored compounds, which, as compared with metal alcoholates, which are readily hydrolyzed, are relatively stable due to the acid character of phenols and have a high melting point. Suitable phenols for forming the metal phenolates are, for example, those which are normally used in the production of phenol resins, such as phenol, cresols, xylenols and alkylphenols, such as p-tertiary butylphenol, p-tertiary amylphenol and the like.

The polyvalent metal-modified phenol-aldehyde resins may be obtained by condensation of a polyvalent metal phenolate with an aldehyde in a manner known for condensing a phenol with an aldehyde to produce a phenol-aldehyde resin. The resulting resin is referred to herein as "a polyvalent metal-modified phenol-aldehyde resin." Suitable aldehydes for this purpose are, for example, likewise, those normally used in the production of phenol resins, such as formaldehyde, hexamethylenetetramine, acetaldehyde, benzaldehyde and unsaturated aldehydes, such as crotonaldehyde.

The metals contained in the polyvalent metal phenolates and polyvalent metal-modified phenol-aldehyde resins of this invention are preferably tri- or tetra-valent metals. Suitable metals include, for example, aluminum, titanium, iron and tin.

Epoxy resins used in the process of this invention are of the type known in the art, such, for instance, as those which have had their hardening characteristics modified in the prior art by the addition of phenol-formaldehyde resins. These epoxy resins are derived from so-called diphenols and epi- or di-halogenhydrins, such as epichlorhydrin and dichlorhydrin. By a "diphenol" is meant an aromatic compound containing two phenolic hydroxyl groups wherein the hydroxyl groups may be in the same aromatic nucleus or may be attached to different aromatic rings which may be bonded together directly or may be bonded together through a bridging group or radical. Suitable diphenols are, for example, p:p'-di-hydroxydiphenylpropane, p:p'-dihydroxydiphenyl, p:p'-dihydroxydiphenylmethane, resorcinol, hydroquinone and dihydroxynaphthalene and the like. In general, we prefer p:p'-dihydroxydiphenylpropane or bisphenol.

The polyvalent metal phenolates or polyvalent metal-modified phenol-aldehyde resins or mixtures thereof are preferably incorporated in solutions of the epoxy resin. Suitable solvents for forming the solution are, for example, ethylene glycol, butanol and toluene and mixtures thereof. After complete homogenization of the components, films can be obtained from the resulting solutions by stoving or heating at elevated temperatures. Such stoved enamels have smooth surfaces, are of light color and possess considerable flexibility. They are resistant to attack by liquid fuel mixtures and chemicals; their high resistance to attack by alkalis, acetic acid and common salt is particularly remarkable.

The amount of hardening agents (i. e. the polyvalent metal phenolate or polyvalent metal-modified phenol-aldehyde resin or mixtures thereof) to be encompassed in the epoxy resins of this invention may be varied between wide limits depending upon the nature of the epoxy resin and of the particular hardening agent used and the desired properties in the products obtained. Even small amounts may have a material effect upon the hardening properties of the epoxy resin. Customarily a minor amount of the hardening agent is incorporated in the resin and usually from about 10 to 40% by weight in relation to the amount of epoxy resin present leads to satisfactory results.

Normally, the resin compositions of this invention may be hardened at a temperature commensurate with that used in hardening epoxy resins containing phenol-aldehyde resins not modified by being derived from polyvalent metal phenolates. The temperature to be used in any specific instance will be readily ascertainable by those skilled in the art but usually is of the order of about 180 to 220° C.

In order that the invention may be more fully understood, the following examples wherein parts are expressed as parts by weight are given for illustrative purposes only.

*Example 1*

Forty-five parts of an epoxy resin, obtained from p:p'-dihydroxydiphenylpropane and epichlorhydrin, are dissolved in 55 parts of ethylene glycol and the resulting resin solution is mixed with 10 parts of a 50% solution of aluminum phenolate in ethylene glycol. A film produced from this solution on black sheet gives, after stoving or heating for 60 minutes at 20° C., a good glossy coating with high resistance to chemicals and good flexibility.

The aluminum phenolate used as the hardening agent in this example was produced in the following manner:

Two hundred eighty-two and three tenths parts of freshly distilled phenol were poured onto 246 parts of aluminum butylate at room temperature and the whole then boiled under reflux for 1 to 2 hours. After distilling off 222.3 parts of butanol, the aluminum phenolate was obtained as a dark-brown, hard resinous mass.

*Example 2*

Twenty-five parts of a commercial epoxy resin are dissolved in 55 parts of a mixture of toluene/butanol (4:1) and mixed with 20 parts of a 50% solution of an aluminum-modified phenol resin in butanol. Coatings hardened in a known manner at 200° C. for 1 hour have similar properties to the films described in Example 1; however, they are clearly superior to the latter with regard to acid resistance.

The aluminum-modified phenol resin of this example was produced as follows:

One hundred sixteen parts of butanol were poured onto 116 parts of aluminum-ortho-cresolate and 30 parts of paraformaldehyde were introduced into the cresolate-butanol mixture. (Molar ratio Al:paraformaldehyde= 1:3 or phenol:paraformaldehyde=1:1). The solution was then heated to boiling under reflux until all the paraformaldehyde was reacted, which was the case when the viscosity of the reaction mixture had reached approximately 25 centipoises at 20° C.

*Example 3*

Forty-five parts of an epoxy resin are dissolved in 55 parts of ethylene glycol and the solution mixed with 12 parts of a 50% butanolic solution of an aluminum-modified phenol resin obtained from aluminum cresolate and benzaldehyde. The properties of the coatings obtained from the resulting mixture by the hardening procedure described in Example 1 or 2 correspond to those of the coatings described in Example 2.

The metal-modified phenol resin of this example was produced as follows:

One hundred sixteen parts of butanol were poured onto 116 parts of an aluminum cresolate prepared in a known manner from aluminum butylate and mixed cresols (40.8% of metacresol) and the mixture obtained was mixed with 35.3 parts of benzaldehyde (molar ratio, Al:benzaldehyde = 1:1 or cresol:benzaldehyde = 3:1) and boiled under reflux for approximately 15 minutes.

*Example 4*

Forty-five parts of a commercial epoxy resin derived from bisphenol and epichlorhydrin are dissolved in 55 parts of toluene/ethylene glycol (8:2) and the resulting resin solution mixed with 15 parts of a 50% solution of aluminum-p-tertiary butylphenolate in ethylene glycol. Films obtained from this mixture by the hardening procedure described in Example 1 or 2 have high stabilities and outstanding elasticity.

The aluminum-p-tertiary butylphenolate used in this example was produced as follows:

Two hundred forty-six parts of aluminum butylate were boiled under reflux for about 2 hours with 150 parts of p-tertiary butylphenol and the butanol liberated (222.3 parts) was then distilled off.

*Example 5*

One hundred parts of the epoxy resin solution described in Example 4 were mixed with 12.5 parts of a 50% solution of titanium meta-cresolate in ethylene glycol and the resulting solution, stoving enamels were obtained by hardening suitable coatings at 180 to 220° C. for 1 to 2 hours.

*Example 6*

One hundred parts of the epoxy resin solution described in Example 4 are mixed with 10.3 parts of a 50% solution of iron (III) xylenolate in ethylene glycol. The films obtained after stoving are darker colored than the aluminum- and titanium-containing films; however, they possess the same high stabilities as well as outstanding elasticity.

The iron tri-xylenolate used in this example as the hardening agent was obtained by reacting equivalent quantities of iron tri-butylate and 2:4-xylenol by boiling under reflux and then distilling off the alcohol, as in the production of aluminum butyl-phenolate described in Example 4.

*Example 7*

One hundred parts of the epoxy resin solution described in Example 4 are mixed with 15.2 parts of a 50% toluene solution of tin (IV)-phenolate, i. e. tin tertaphenolate, and enamels are obtained from the resulting mixture by stoving at 220° C. for 45 minutes.

*Example 8*

One hundred parts of the epoxy resin solution described in Example 4 are mixed with 25 parts of a 50% butanol solution of an aluminum-modified phenol resin, prepared from aluminum phenolate and paraformaldehyde, and stoving lacquers are obtained from the resulting solution by suitable stoving. The films obtained are distinguished from films hardened with metal phenolates by a particularly high resistance to acetic acid.

The aluminum-modified phenol resin of this example was produced as follows:

One hundred two parts of butanol were poured onto 102 parts of aluminum phenolate, and 30 parts of paraformaldehyde were then introduced and condensed for 30 minutes under reflux.

*Example 9*

One hundred parts of the epoxy resin solution described in Example 4 are mixed with 30 parts of a 50% butanol solution of a titanium-modified phenol resin prepared from titanium meta-cresolate and hexamethylenetetramine and stoving lacquers are produced from the resulting lacquer solution.

The titanium-modified phenol resin of this example was produced as follows:

Four hundred eighty parts of butanol were poured onto 476 parts of titanium meta-cresolate and mixed with 140 parts of hexamethylenetetramine, the mixture then being heated for 10 minutes under reflux.

*Example 10*

One hundred parts of the epoxy resin solution described in Example 4 are mixed with 36 parts of a 50% butanol solution of iron-modified phenol resin prepared from iron (III)-xylenolate and acetaldehyde and films can be obtained from the resulting solution by stoving at 200° C. for 60 minutes.

The iron-modified phenol resin solution of this example used as the hardening agent was produced as follows:

Four hundred eighteen parts of butanol were poured onto 419 parts of iron tri-xylenolate, mixed with 132 parts of acetaldehyde and the whole then condensed for about 30 minutes under reflux.

*Example 11*

One hundred parts of the epoxy resin solution described in Example 4 are mixed with 20 parts of a 50% toluene solution of an aluminum-modified phenol resin prepared from aluminum phenolate and crotonaldehyde and films can be obtained by stoving in a known manner.

The hardening agent for this example was produced as follows:

One hundred two parts of butanol were poured onto 102 parts of aluminum-phenolate, mixed with 70 parts of crotonaldehyde and the mixture then condensed for about 30 minutes under reflux.

*Example 12*

One hundred parts of the epoxy resin solution described in Example 4 were mixed with 25 parts of a 50% butanol solution of an aluminum-modified phenol resin prepared from aluminum-p-tertiary butylphenolate and paraformaldehyde and films can be obtained by stoving in a known manner.

The aluminum-modified phenol resin was produced as follows:

Four hundred seventy-four parts of butanol were poured onto 474 parts of aluminum-p-tertiary butylphenolate (prepared as described in Example 4) mixed with 90 parts of paraformaldehyde and condensed for about 30 minutes under reflux.

The practice of this invention has been exemplified by various details and illustrative embodiments. It will be understood, however, that the details may be varied extensively and that substitutions, additions or omissions can be made without departing from the scope or spirit of the invention which is intended to be defined by the appended claims.

What is claimed is:

1. A heat hardenable epoxy resin composition containing an epoxy resin derived from a diphenol and a compound selected from the group consisting of epi-halogenhydrin and di-halogenhydrin, and as a hardening agent for the epoxy resin a substance selected from the group consisting of a polyvalent metal phenolate, a polyvalent metal-modified phenol-aldehyde resin and mixtures thereof wherein the polyvalent metal is selected from a group consisting of aluminum, titanium, iron and tin.

2. A heat hardenable epoxy resin composition containing an epoxy resin derived from a diphenol and a compound selected from the group consisting of epi-halogenhydrin and di-halogenhydrin and as a hardening agent for the epoxy resin a polyvalent metal phenolate wherein the metal is selected from the group consisting of aluminum, titanium, iron and tin.

3. A composition in accordance with claim 2 in which the phenolate is derived from phenol.

4. A composition in accordance with claim 2 in which the phenolate is derived from an alkyl phenol.

5. A heat hardenable epoxy resin composition containing an epoxy resin derived from a diphenol and a compound selected from the group consisting of epi-halogenhydrin and di-halogenhydrin and as a hardening agent for the epoxy resin a polyvalent metal-modified phenolaldehyde resin wherein the polyvalent metal is selected from the group consisting of aluminum, titanium, iron and tin.

6. A composition in accordance with claim 5 in which the phenol of the phenol-aldehyde resin is phenol.

7. A composition in accordance with claim 5 in which the phenol of the phenol-aldehyde resin is an alkyl phenol.

8. A heat hardenable epoxy resin composition containing an epoxy resin derived from a diphenol and a compound selected from the group consisting of epi-halogenhydrin and di-halogenhydrin and as a hardening agent for the epoxy resin aluminum phenolate.

9. A heat hardenable epoxy resin composition containing an epoxy resin derived from a diphenol and a compound selected from the group consisting of epi-halogenhydrin and di-halogenhydrin and as a hardening agent for the epoxy resin an aluminum modified phenol-aldehyde resin.

10. A heat hardenable epoxy resin composition containing an epoxy resin derived from a diphenol and a compound selected from the group consisting of epi-halogenhydrin and di-halogenhydrin and as a hardening agent for the epoxy resin titanium phenolate.

11. A heat hardenable epoxy resin composition containing an epoxy resin derived from a diphenol and a compound selected from the group consisting of epi-halogenhydrin and di-halogenhydrin and as a hardening agent for the epoxy resin a titanium-modified phenol-aldehyde resin.

12. A heat hardenable epoxy resin composition containing an epoxy resin derived from a diphenol and a compound selected from the group consisting of epi-halogenhydrin and di-halogenhydrin and as a hardening agent for the epoxy resin iron-phenolate.

13. A heat hardenable epoxy resin composition containing an epoxy resin derived from a diphenol and a compound selected from the group consisting of epi-halogenhydrin and di-halogenhydrin and as a hardening agent for the epoxy resin an iron-modified phenol-aldehyde resin.

14. A heat hardenable epoxy resin composition containing an epoxy resin derived from a diphenol and a compound selected from the group consisting of epi-halogenhydrin and di-halogenhydrin and as a hardening agent for the epoxy resin tin phenolate.

15. A process for preparing epoxy resin compositions of improved heat hardenable qualities, which comprises incorporating in an epoxy resin derived from a diphenol and a compound selected from the group consisting of epi-halogenhydrin and di-halogenhydrin which is to be hardened a substance selected from the group consisting of a polyvalent metal phenolate, a polyvalent metal-modified phenol-aldehyde resin and mixtures thereof, the polyvalent metal being selected from the group consisting of aluminum, titanium, iron and tin and heating the epoxy resin containing said incorporated substance at an elevated temperature producing a hardenable epoxy resin.

16. A process for preparing epoxy resin compositions of improved heat hardenable qualities, which comprises incorporating in an epoxy derived from a diphenol and a compound selected from the group consisting of epi-halogenhydrin and di-halogenhydrin which is to be hardened aluminum phenolate and heating the epoxy resin containing said incorporated substance at an elevated temperature producing a hardenable epoxy resin.

17. A process for preparing epoxy resin compositions of improved heat hardenable qualities, which comprises incorporating in an epoxy resin derived from a diphenol and a compound selected from the group consisting of epi-halogenhydrin and di-halogenhydrin which is to be hardened an aluminum-modified phenol-aldehyde resin and heating the epoxy resin containing said incorporated substance at an elevated temperature producing a hardenable epoxy resin.

18. A process for preparing epoxy resin compositions of improved heat hardenable qualities, which comprises incorporating in an organic solvent solution of an epoxy resin derived from a diphenol and a compound selected from the group consisting of epi-halogenhydrin and di-halogenhydrin which is to be hardened a substance selected from the group consisting of polyvalent metal phenolate, polyvalent metal-modified phenolate and mixtures thereof dissolved in an organic solvent, the polyvalent metal being selected from the group consisting of aluminum, titanium, iron and tin, and heating the epoxy resin and said incorporated substance at an elevated temperature producing a hardenable epoxy resin.

19. The process in accordance with claim 18 wherein the organic solvent in each instance is selected from the group consisting of ethylene glycol, butanol, toluene and mixtures thereof.

20. A process for preparing heat hardenable epoxy resin compositions of improved qualities, which comprises mixing and heating at temperatures of the order of 180 to 220° C. an organic solvent solution of an epoxy resin derived from a diphenol and a compound selected from the group consisting of epi-halogenhydrin and di-halogenhydrin and an organic solvent solution of a substance selected from the group consisting of a polyvalent metal phenolate, a polyvalent metal-modified phenol-aldehyde resin and mixtures thereof, said polyvalent metal being selected from the group consisting of aluminum, titanium, iron and tin, said organic solvent in each instance being selected from the group consisting of ethylene glycol, butanol, toluene and mixtures thereof.

References Cited in the file of this patent

UNITED STATES PATENTS

| | | |
|---|---|---|
| 2,559,347 | Dannenberg | July 3, 1951 |
| 2,682,515 | Naps | June 29, 1954 |

FOREIGN PATENTS

| | | |
|---|---|---|
| 1,058,020 | France | Nov. 4, 1953 |

U. S. DEPARTMENT OF COMMERCE
PATENT OFFICE

CERTIFICATE OF CORRECTION

Patent No. 2,837,493     Felix Schlenker     June 3, 1958

It is hereby certified that error appears in the printed specification of the above numbered patent requiring correction and that the said Letters Patent should read as corrected below.

Column 3, line 15, for "20° C." read -- 200° C. --; column 4, line 12, Example 5, after "and" insert -- from --; line 33, Example 7, for "tertaphenolate" read -- tetraphenolate --; column 6, line 56, after "epoxy" insert -- resin --.

Signed and sealed this 5th day of August 1958.

(SEAL)
Attest:
KARL H. AXLINE
Attesting Officer

ROBERT C. WATSON
Commissioner of Patents